(12) United States Patent
Arimilli et al.

(10) Patent No.: US 6,230,242 B1
(45) Date of Patent: May 8, 2001

(54) STORE INSTRUCTION HAVING VERTICAL MEMORY HIERARCHY CONTROL BITS

(75) Inventors: Ravi Kumar Arimilli, Austin; John Steve Dodson, Pflugerville; Guy Lynn Guthrie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,753

(22) Filed: Aug. 5, 1999

(51) Int. Cl.[7] ....................................... G06F 13/14
(52) U.S. Cl. ............................. 711/122; 712/225
(58) Field of Search ..................... 711/122; 712/207, 712/225, 228

(56) References Cited

U.S. PATENT DOCUMENTS

| | | | |
|---|---|---|---|
| 4,429,363 | * 1/1984 | Duke et al. | 711/122 |
| 5,386,547 | 1/1995 | Jouppi | 711/122 |
| 5,579,493 | * 11/1996 | Kiuchi et al. | 712/207 |
| 5,623,627 | 4/1997 | Witt | 711/122 |
| 5,721,864 | * 2/1998 | Chiarot et al. | 712/207 |
| 5,724,549 | * 3/1998 | Selgas et al. | 711/141 |
| 5,774,685 | * 6/1998 | Dubey | 712/205 |
| 5,809,522 | * 9/1998 | Novak et al. | 711/118 |
| 5,829,038 | * 10/1998 | Merrell et al. | 711/143 |

\* cited by examiner

*Primary Examiner*—David L. Robertson
(74) *Attorney, Agent, or Firm*—Casimer K. Salys; Felsman, Bradley, Vaden, Gunter & Dillon, LLP

(57) ABSTRACT

A STORE instruction having vertical memory hierarchy control bits is disclosed. The STORE instruction comprises an operation code field, a write-through field, and a vertical write-through level field. The vertical write-through level field indicates a vertical memory level within a memory hierarchy to which the STORE operation should be applied, when the write-through field is set.

15 Claims, 2 Drawing Sheets

STORE INSTRUCTION HAVING VERTICAL MEMORY HIERARCHY CONTROL BITS

RELATED PATENT APPLICATIONS

The present patent application is related to copending applications:

1. U.S. Ser. No. 09/368,754, filed on even date, entitled "A STORE INSTRUCTION HAVING HORIZONTAL MEMORY HIERARCHY CONTROL BITS";
2. U.S. Ser. No. 09/368,755, filed on even date, entitled "AN APPARATUS FOR ADJUSTING A STORE INSTRUCTION HAVING MEMORY HIERARCHY CONTROL BITS"; and
3. U.S. Ser. No. 09/368,756, filed on even date, entitled "AN OPTIMIZING COMPILER FOR GENERATING STORE INSTRUCTIONS HAVING MEMORY HIERARCHY CONTROL BITS".

BACKGROUND OF THE INVENTION

1. Technical Field

The present invention relates to a data processing in general, and in particular to a STORE instruction to be utilized within a data processing system. Still more particularly, the present invention relates to a STORE instruction having vertical memory hierarchy control bits to be utilized within a data processing system.

2. Description of the Prior Art

Typically, Reduced Instruction Set Computing (RISC) processors have fewer instructions than their Complex Instruction Set Computing (CISC) counterparts. Thus, to a certain extent, RISC technology simplifies the task of writing compilers for processors that utilize a RISC instruction set. Moreover, from a processor design standpoint, focus can be placed on implementing and optimizing those important and frequently-used instructions rather than having some complex but seldom-used instructions constrain the maximum operating efficiency. Because of the above-mentioned reasons and others, RISC processors are gaining popularity among workstation and even some lower-end computer manufacturers.

For RISC processors, it is common that very few instructions are actually memory access instructions. In fact, some implementations may have only two instructions, LOAD and STORE, that access memories. Typically, a few specialized "atomic" operations may also be supported by the RISC processor for synchronization and memory updates via concurrent processes. Even in such cases, LOAD and STORE instructions are by far the most frequently-used memory access instructions for RISC processors. The execution of a LOAD instruction will cause a processor register to be written with data associated with in a specified main memory address. Conversely, the execution of a STORE instruction will cause data resident in a processor register to be written to a memory hierarchy in association with a main memory address. The present invention is related to a STORE instruction for updating data within a memory hierarchy of data processing system.

SUMMARY OF THE INVENTION

In accordance with a preferred embodiment of the present invention, a STORE instruction comprises an operation code field, a write-through field, and a vertical write-through level field. The vertical write-through level field indicates a vertical memory level within a memory hierarchy to which the STORE operation should be applied, when the write-through field is set.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

For the purpose of illustration, the present invention is demonstrated using a multiprocessor data processing system having three levels of cache memory. However, it should be understood that the features of the present invention may be applicable in any data processing system having multiple levels of cache memory.

Figure 1:
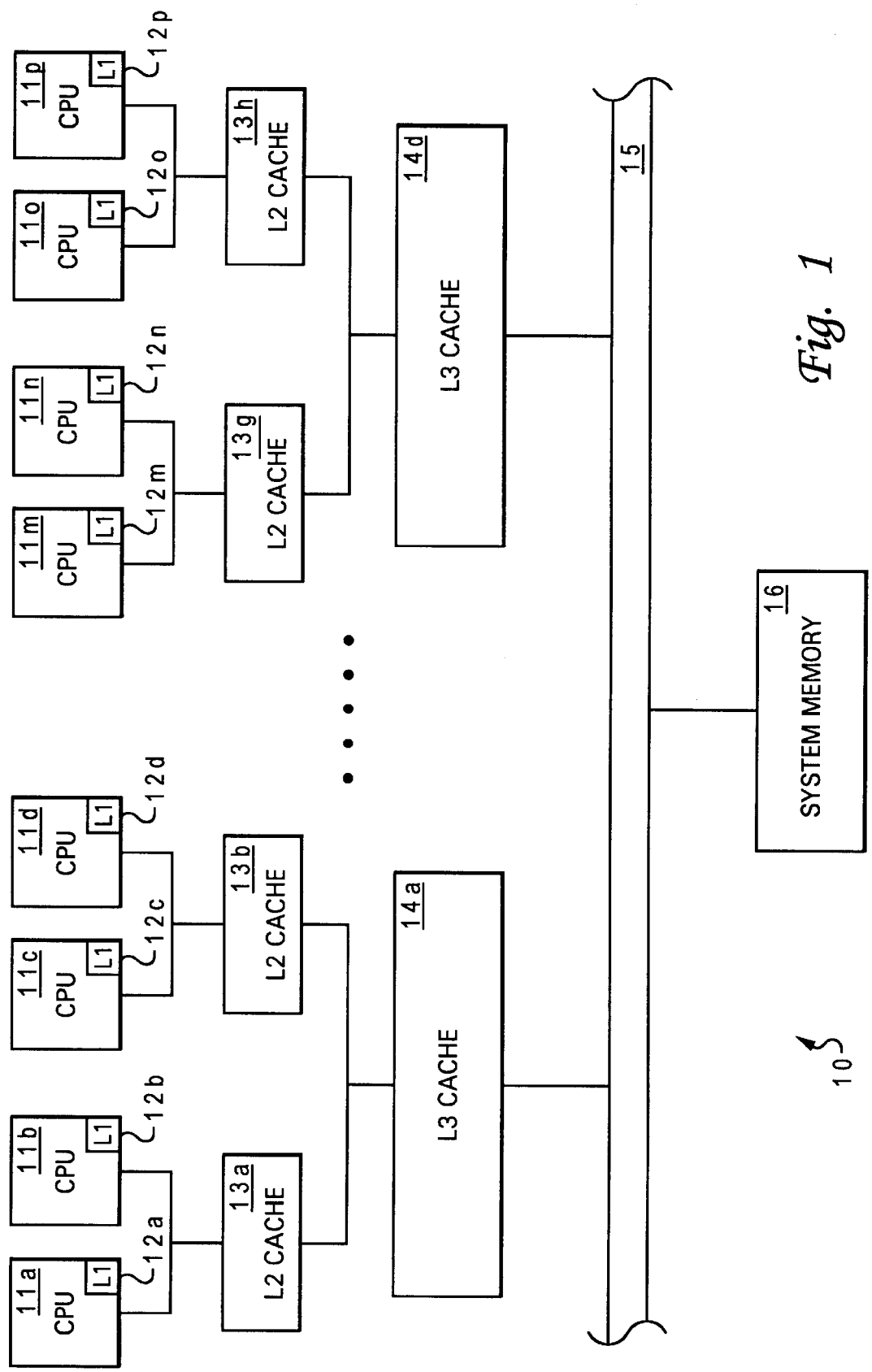
FIG. 1 is a block diagram of a data processing system in which a preferred embodiment of the present invention is incorporated.

Referring now to the drawings and, in particular, to FIG. 1, there is depicted a block diagram of a multiprocessor data processing system 10 in which a preferred embodiment of the present invention is incorporated. As shown, data processing system 10 includes multiple central processor units (CPUs) 11*a*–11*p*, and each of CPUs 11*a*–11*p* contains a level one (L1) cache. For example, CPU 11*a* contains an L1 cache 12*a*, and CPU 11*b* contains an L1 cache 12*b*. Each of CPUs 11*a*–11*p* (including L1 caches 12*a*–12*p*) is coupled to a respective one of level two (L2) caches 13*a*–13*h*. Similarly, each of L2 caches 12*a*–12*h* is coupled to a respective one of level three (L3) caches 14*a*–14*d*. The lowest level of the memory hierarchy as shown in FIG. 1 is a system memory 16.

Each succeeding lower level from L1 caches 12*a*–12*p* of the memory hierarchy is capable of storing a larger amount of information than upper levels, but at a higher access latency. For example, L1 caches 12*a*–12*p* may each have 512 64-byte cache lines for a total storage capacity of 32 kilobytes, all at a single cycle latency. L2 caches 13*a*–13*h* may each have 2048 128-byte cache lines for a total storage capacity of 256 kilobytes, all at a latency of approximately 10–20 cycles. L3 caches 14*a*–14*d* may each have 4096 256-byte cache lines for a total storage capacity of one megabyte, all at a latency of approximately 40–60 cycles. Finally, system memory 16 can store tens or hundreds of megabytes of data at a latency of at least 300 cycles. Given the large disparity in access latencies between the various levels of memories within the memory hierarchy, it is advantageous to reduce the frequency of access to lower levels of memories within the memory hierarchy such as system memory 16.

CPUs 11*a*–11*p*, L1 caches 12*a*–12*p*, L2 caches 13*a*–13*h*, and L3 caches 14*a*–14*d* are coupled to system memory 16 via an interconnect 15. Interconnect 15, which can be either a bus or a cross-point switch, serves as a conduit for communication transactions between CPUs 11*a*–11*p* and other snoopers coupled to interconnect 15. A typical transaction on interconnect 15 begins with a request, which may include a transaction field indicating the type of transaction, source and destination tags indicating the source and intended recipient(s) of the transaction, respectively, and an address and/or data. Each component connected to interconnect 15 preferably snoops all transactions on interconnect 15 and, if appropriate, responds to the request with a snoop response.

Those skilled in the art will appreciate that data processing system 10 can include many additional components, such as bus bridges, input/output devices, non-volatile storage devices, ports for connection to networks, etc. Because those additional components are not necessary for an understanding of the present invention, they are not illustrated in FIG. 1 or discussed further herein. Although a preferred embodiment of a multiprocessor data processing system is described in FIG. 1, it should be understood that the present invention can be implemented in a variety of system configurations.

Figure 2:
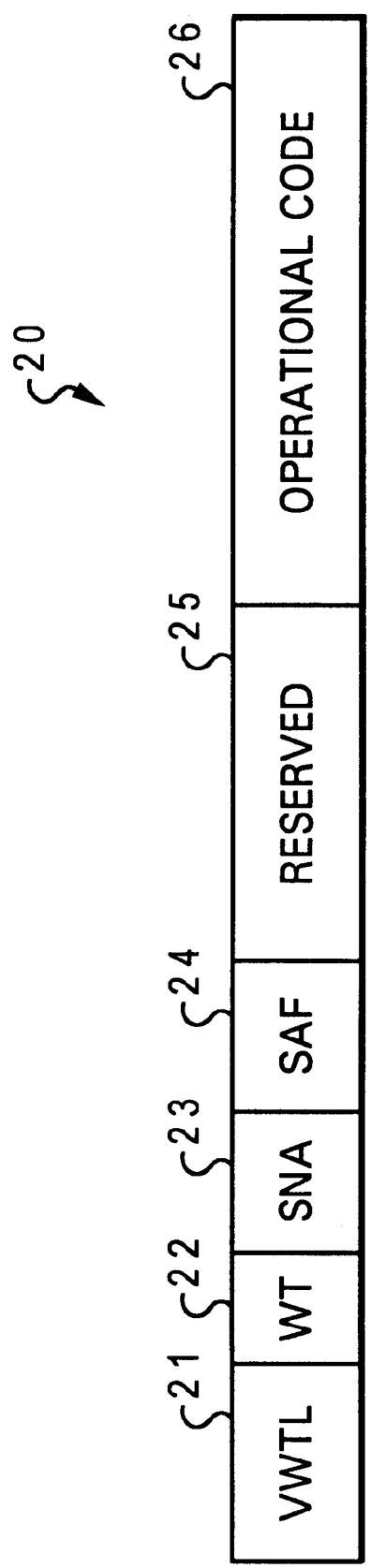
FIG. 2 is a block diagram of a STORE instruction having vertical memory hierarchy control bits to be utilized within the data processing system from FIG. 1, in accordance with a preferred embodiment of the present invention.

With reference now to FIG. 2, there is illustrated a block diagram of a STORE instruction having a group of vertical memory hierarchy control bits to be utilized within the data processing system from FIG. 1, in accordance with a preferred embodiment of the present invention. As shown, a STORE instruction 20 includes a Vertical Write Through Level (VWTL) field 21, a Write-Through (WT) field 22, a Store_but_do_Not_Allocate (SNA) field 23, a Store_And_Flush (SAF) field 24, a reserved field 25, and an operational code (opcode) field 26.

VWTL field 21, having two bits in this implementation, is valid when WT field 22 equals one. VWTL field 21 indicates the vertical memory level within a memory hierarchy to which a STORE operation should be applied. With the memory hierarchy as shown in FIG. 1, the bits of VWTL field 21 are preferably assigned as shown in Table I.

TABLE I

| VWTL bits | operation |
|---|---|
| 00 | store down to an L1 cache memory |
| 01 | store down to an L2 cache memory |
| 10 | store down to an L3 cache memory |
| 11 | store down to a system memory |

For example, when the bits within VWTL field 21 of a STORE instruction are "00," the data associated with the STORE instruction is coherently placed (i.e., cache states of other cache memories will be adjusted accordingly to reflect the new state) in an L1 cache memory (such as one of L1 caches 12a–12p from FIG. 1) that is associated with the initiating CPU. As another example, when the bits within VWTL field 21 of a STORE instruction are "11," the data from the STORE instruction is placed in an L1 cache memory, an L2 cache memory (such as one of L2 caches 13a–13h from FIG. 1), and an L3 cache memory (such as one of L3 caches 14a–14d from FIG. 1) that are associated with the initiating CPU as well as a system memory (such as system memory 16 from FIG. 1). The number of bits within VWTL field 21 depends on the number of levels of memories within a memory hierarchy.

WT field 22, having one bit, indicates whether or not there should be a write-through at a cache memory. The bits within WT field 22 are preferably assigned as shown in Table II.

TABLE II

| WT bit | operation |
|---|---|
| 0 | if hit, store into current level of cache<br>if miss, allocate entry and store into current level of cache |
| 1 | if (hit AND VWTL <> current level of cache), store into current level of cache and forward STORE to a lower level cache;<br>if (hit AND VWTL = current level of cache), store into current level or cache;<br>if (miss AND VWTL <> current level of cache), conditionally allocate entry and store into current level of cache and forward store to lower level cache;<br>if (miss AND VWTL = current level of cache), allocate entry and store into current level of cache |

When the WT bit equals zero (meaning no write-through), the data associated with a STORE instruction is stored in the current level of a cache memory if there is a cache "hit" at the current level; otherwise, the data is stored in the current level of the cache memory after a cache line has been allocated if there is a cache "miss" at the current level.

When the WT bit equals one (meaning write-through), the data associated with a STORE instruction is stored in the current level of a cache memory if there is a cache "hit" and the VWTL bits point to the current level of the cache memory; otherwise, the data is also forwarded to the next lower level of the cache memory if there is a cache "hit" and the VWTL bits do not point to the current level of the cache memory. However, if there is a cache "miss" and the VWTL bits point to the current level of the cache memory, the data is stored in the current level of the cache memory after a cache line has been allocated.

Otherwise, if there is a cache "miss" and the VWTL bits do not point to the current level of the cache memory, the data may be stored in the current level of the cache memory after a cache line has been allocated, depending on the status of SNA field 23 and SAF field 24 described infra, and the data is also forwarded to the next lower level of the cache memory.

SNA field 23, having a single bit, indicates whether data should be stored in the current level of a memory hierarchy when there is a cache "miss." The bits of SNA field 23 are preferably assigned as shown in Table III. When the SNA bit equals zero, the data associated with a STORE instruction is stored in the current level of a cache memory regardless of whether there is a cache "hit" or "miss." When the SNA bit equals one, the data is stored in the current level of a cache memory if there is a cache "hit."

If there is a cache "miss" when the SNA bit equals one, the data is stored in the current level of the cache memory after a cache line has been allocated when the VWTL bits point to the current level of the cache memory. However, when the VWTL bits do not point to the current level of the cache memory, the data is forwarded to the next lower level of the cache memory, without storing at the current level of the cache memory.

TABLE III

| SNA bit | operation |
|---|---|
| 0 | if hit, store into current level of cache<br>if miss, store into current level of cache |
| 1 | if hit, store into current level of cache<br>if (miss AND VWTL <> current level of cache), do NOT store into current level of cache and pass store to lower level of cache<br>if (miss AND VWTL = current level of cache), allocate entry and store into current level of cache |

SAF field 24, having a single bit, indicates the level of a memory hierarchy at which the data from a STORE instruction should be stored, above which whether the data should be flushed. The bits of SAF field 24 are preferably assigned as shown in Table IV. When the SAF bit equals zero, the data associated with a STORE instruction is stored in the current level of a cache memory if there is a cache "hit;" otherwise, the data is stored in the current level of the cache memory after a cache line has been allocated if there is a cache "miss."

TABLE IV

SAF bit operation

| | |
|---|---|
| 0 | if hit, store into current level of cache |
| | if miss, allocate entry and store into current level of cache |
| 1 | if (hit AND VWTL <> current level of cache), store into current level of cache then cast out the line to the lower level cache; |
| | if (hit AND VWTL = current level of cache), store into current level or cache; |
| | if (miss AND VWTL <> current level of cache), pass store to lower level cache (don't allocate current cache level) |
| | if (miss AND VWTL = current level of cache), allocate entry and store into current level of cache |

When the SAF bit equals one, the data associated with a STORE instruction is stored in the current level of the cache memory if there is a cache "hit" and the VWTL bits point to the current level of the cache memory; otherwise, the data is stored in the current level and then the cache line is cast out to the next lower level of the cache memory if there is a cache "hit" and the VWTL bits do not point to the current level of the cache memory. However, if there is a cache "miss" and the VWTL bits point to the current level of the cache memory, the data is stored in the current level of the cache memory after a cache line has been allocated; otherwise, the data is forwarded to the next lower level of the cache memory without allocating a cache line at the current level of the cache memory if there is a cache "miss" and the VWTL bits do not point to the current level of the cache memory.

Reserved field 25 reserves a number of bits within instruction 20 for future usage. Opcode field 26 defines the instruction type and operation of instruction 20.

As has been described, the present invention provides a STORE instruction having vertical memory hierarchy control bits to be utilized within a data processing system. With the present invention, a more versatile control of the storing of data in each level of memory within a memory hierarchy can be provided via a STORE instruction.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:
a multi-level memory hierarchy having a plurality levels of cache memories and a system memory; and
an instruction for updating data within said multi-level memory hierarchy, wherein said instruction includes:
an operation code field; and
a vertical write-through level field for indicating a vertical memory level within said multi-level memory hierarchy to which said updating operation should be applied.

2. The data processing system according to claim 1, wherein said instruction further includes a write-through field for indicating said updating operation should be applied when said write-through field is set.

3. The data processing system according to claim 1, wherein said instruction further includes a store but do not allocate field for indicating whether data should be stored in a current level of said multi-level memory hierarchy when there is a cache "miss."

4. The data processing system according to claim 1, wherein said instruction further includes a store and flush field for a indicating a level of said multi-level memory hierarchy at which said data should be stored, above which whether said data should be flushed.

5. The data processing system according to claim 1, wherein said instruction is a STORE instruction.

6. A method for updating data within a multi-level memory hierarchy within a data processing system, said method comprising the steps of:
providing an instruction;
providing an operation code field within said instruction for indicating an updating operation; and
providing a vertical write-through level field within said instruction for indicating a vertical memory level within said multi-level memory hierarchy to which said updating operation should be applied.

7. The method according to claim 6, wherein said method further includes a step of providing a write-through field for indicating said updating operation should be applied when said write-through field is set.

8. The method according to claim 6, wherein said method further includes a step of providing a store but do not allocate field for indicating whether data should be stored in a current level of said multi-level memory hierarchy when there is a cache "miss."

9. The method according to claim 6, wherein said method further includes a step of providing a store and flush field for indicating a level of said multi-level memory hierarchy at which said data should be stored, above which whether said data should be flushed.

10. The method according to claim 6, wherein said instruction is a STORE instruction.

11. An instruction to be utilized within a data processing system having a multi-level memory hierarchy, comprising:
an operation code field; and
a vertical write-through level field for indicating a vertical memory level within said multi-level memory hierarchy to which said updating operation should be applied.

12. The instruction according to claim 11, wherein said instruction further includes a write-through field for indicating said updating operation should be applied when said write-through field is set.

13. The instruction according to claim 11, wherein said instruction further includes a store but do not allocate field for indicating whether data should be stored in a current level of said multi-level memory hierarchy when there is a cache "miss."

14. The instruction according to claim 11, wherein said instruction further includes a store and flush field for indicating a level of said multi-level memory hierarchy at which said data should be stored, above which whether said data should be flushed.

15. The instruction according to claim 11, wherein said instruction is a STORE instruction.

* * * * *